United States Patent [19]

Takahashi et al.

[11] Patent Number: 4,690,513
[45] Date of Patent: Sep. 1, 1987

[54] WIDE ANGLE HIGH RANGE ZOOM LENS

[75] Inventors: Sadatoshi Takahashi, Tokyo; Tsunefumi Tanaka, Kanagawa, both of Japan

[73] Assignee: Canon Kabushiki Kaisha, Tokyo, Japan

[21] Appl. No.: 759,907

[22] Filed: Jul. 29, 1985

[30] Foreign Application Priority Data

Jul. 31, 1984 [JP] Japan .................. 59-161049
Dec. 13, 1984 [JP] Japan .................. 59-263636

[51] Int. Cl.$^4$ .................. G02B 7/10; G02B 9/64; G02B 15/14
[52] U.S. Cl. .................. 350/427
[58] Field of Search .................. 350/427

[56] References Cited

U.S. PATENT DOCUMENTS 4,572,620 2/1986 Kikuchi .................. 350/432

FOREIGN PATENT DOCUMENTS 0165107 12/1981 Japan .................. 350/423

Primary Examiner—John K. Corbin
Assistant Examiner—Rebecca D. Gass
Attorney, Agent, or Firm—Toren, McGeady & Associates

[57] ABSTRACT

A zoom lens is constructed, from front to rear, of a first lens unit of positive power, a second lens unit of negative power, a third lens unit of positive power and a fourth lens unit of positive or negative power. When zooming from the wide angle to the telephoto end, the first and third lens units move forward at the same speed, while the second lens unit moves simultaneously in non-linearly differential relation to the first and third lens unit. The zoom lens satisfies the following conditions:

$$0.4\, fT < f1 < 0.65\, fT$$

$$0.4\, fW < |f2| < 0.25\, fT$$

$$0.12\, fT < f3 < 0.35\, fT$$

$$-0.18 < fW/f4$$

$$fT/f4 < 0.1$$

$$0.8 < |\beta 2T| < 1.0$$

where f1 to f4 are the focal lengths of the first to the fourth lens units, respectively, fW and fT are the shortest and longest focal lengths of the entire zoom lens system, respectively and $\beta 2T$ is the magnifying power of the second lens unit in the telephoto end.

10 Claims, 23 Drawing Figures

WIDE ANGLE HIGH RANGE ZOOM LENS

BACKGROUND OF THE INVENTION

1. Field of the Invention

This invention relates to zoom lenses, and more particularly to wide angle high range compact zoom lenses suited for still cameras and video cameras.

Description of the Prior Art

In the field of still cameras and video cameras, a demand exists for zoom lenses of wider image angles and increased ranges. In general, an increase in the image angle of the zoom lens produces high order aberrations which are difficult to correct. An increase in the varifocal range requires an increase in either or both of the refractive power of each lens component and the total zoom movement. This leads to an increase in the diameter of the front lens component, as well as in the total length of the zoom lens. Therefore, it is difficult to minimize the bulk and size of the entire system.

Japanese Patent Publication No. SHO 44-14877 discloses a zoom lens which is constructed, from front to rear, of positive, negative, positive and positive lens units. When zooming from the wide angle to the telephoto end, the first and third lens units are moved axially at the same speed, while the second unit is moved axially in non-linearly differential relation. This zoom lens, because it is of the telephoto type, has a relatively narrow maximum angular field of view of 38.3°.

Japanese Laid-Open Patent Application No. SHO 54-30855 discloses a zoom lens of this type but with a widened maximum angular field of 64°. However, this zoom lens has a zoom range of about 3 times, which is not always satisfactory.

Attempts have been made to extend the range while preserving good stability of aberration throughout the extended range by increasing the number of zoom components. Such a system is disclosed in Japanese Laid-Open Patent Applications Nos. SHO 57-168209 and SHO 57-169716, wherein the zoom lens is constructed of four lens units of positive, negative, positive and positive powers, from front to the rear, all of which are movable for zooming. The arrangement of the refractive power of these four lens units is such that the paraxial pencil of rays emerging from the third lens unit is parallel. The use of such a refractive power arrangement tends to give the lens a relatively long total length. By converging the paraxial pencil of rays, the total length of the lens shortens, but the range of variation of aberrations with zooming increases. In general, therefore, it is very difficult to achieve good stability of aberration correction throughout the extended range.

SUMMARY OF THE INVENTION

A general object of the invention is to provide a zoom lens of widened angular field and extended range having a minimum bulk and size.

Another object of the invention is to provide a zoom lens corrected for good stability of aberrations throughout the extended range.

Still another object of the invention is to provide a zoom lens having a maximum angular field of 62 degrees and a zoom ratio of about 3.7.

To accomplish these objects, the zoom lens of the invention is constructed, from front to rear, of a first lens unit of positive power, a second lens unit of negative power, a third lens unit of positive power and a fourth lens unit of positive or negative power. When zooming from the wide angle to the telephoto end, the first and third lens units are moved axially forward, while the second lens unit is moved axially in non-linearly differential relation to the movement of the first and third lens units. The zoom lens satisfies the following conditions:

$$0.4fT < f1 < 0.65fT \tag{1}$$

$$0.4fW < |f2| < 0.25fT \tag{2}$$

$$0.12fT < f3 < 0.35fT \tag{3}$$

$$-0.18 < fW/f4 \tag{4}$$

$$fT/f4 < 0.1 \tag{5}$$

$$0.8 < |\beta 2T| < 1.0 \tag{6}$$

where fi is the focal length of the i-th lens unit counting from the front, fW and fT are the shortest and longest focal lengths of the entire zoom lens system, respectively, and $\beta 2T$ is the magnifying power of the second lens unit in the telephoto end.

In applying the invention to a zoom lens of such a refractive power arrangement, by using a particular zoom method and giving particular ranges for the refractive power of each lens unit and the magnifying power of the second lens unit, valuable increases in the angular field of view and the varifocal range are achieved while still permitting a minimization of the bulk and size of the entire zoom lens system.

To achieve good correction of image aberrations, the differential relation to the first and third lens units, in which the second lens unit moves axially, is nonlinear, to compensate for the image shift resulting from the variation of the image magnification.

Additional features of the invention are set forth particularly from the point of view of assisting in good stability of aberration correction throughout the extended range. The third lens unit is thus constructed from a lens 3A whose rear surface is concave toward the rear and another lens of positive power arranged on the image side of the lens 3A having at least one aspherical surface. The fourth lens unit is constructed in the form of a meniscus doublet of rearward convexity consisting of a lens 4A of negative power and another lens 4B of positive power made of a glass having a lower refractive index than that of the glass of the lens 4A. Lenses 4A and 4B are cemented together at their adjoining surfaces.

It should be recognized that in the present invention, three movable lens units for zooming are used for increasing the varifocal range without having to increase the total zooming movement. The range of variation of aberrations with zooming is reduced by using the above-stated design, particularly with the third lens unit as the variator.

If a zoom lens of the type described were constructed so that all the refracting surfaces are spherical, and each lens unit were well corrected for various aberrations, the necessary number of elements in each lens unit must increase. As a result, the total length of the entire system increases, and its weight becomes heavier. Also, if the method of reducing the size were by increasing the refractive power of, for example, the third lens unit, it would produce large spherical aberration and astigmatism. It is difficult to correct these aberrations using other lens units. The use of lens units other than the third lens unit particularly for reducing the variation of the aberrations with zooming makes it difficult to preserve good image quality, because the power distribution becomes inappropriate. If the variation of aberrations were otherwise reduced by introducing a diverging lens surface into the third lens unit, an additional positive lens must be used. This involves a large increase in the longitudinal length of the entire zoom lens system. Another problem is that the higher order aberrations produced from the strong diverging surface are difficult to correct.

According to the present invention, use is made of an aspherical surface applied to a lens of positive power constituting part of the third lens unit. This produces advantages in that the aberrations are maintained stable against variation of the image magnification, and further that the longitudinal length of the entire zoom lens system is prevented from increasing.

In more detail, a shortening of the total length of the zoom lens is achieved by increasing the refractive power of the third lens unit. The resulting increase in the spherical aberration and astigmatism is cancelled by using a lens 3A having a concave surface of strong negative refractive power in the third lens unit. While the spherical aberration for the wide angle and telephoto positions is well corrected by this lens 3A, over-correction of spherical aberration results in the intermediate focal length positions. This over-corrected spherical aberration is then corrected by an aspherical lens 3B. In other words, the duty of contributing to a negative refractive power which would otherwise be borne solely by the lens 3A is partly borne by the lens 3B. Specifically, as the refractive power of the lens 3A weakens, the variation of spherical aberration with zooming is reduced.

The introduction of the aspherical surface makes it more difficult to stabilize the astigmatism. That is, as the spherical surface takes part of the diverging action, the meridional image surface changes from being under-corrected to being over-corrected in the wide angle region, but almost never changes from being under-corrected in the remaining region from the intermediate focal length position to the telephoto end.

The height of incidence of an oblique pencil on the fourth lens unit, which remains stationary during zooming, is lowest when in the wide angle end and highest when in the intermediate focal length to the telephoto end. Thus, according to the invention, the fourth lens unit is constructed from a meniscus-shaped cemented lens of rearward convexity consisting of a lens 4A of negative power and a lens 4B of positive power made of a glass having a lower refractive index than that of the glass of the lens 4A. It is thus possible to achieve good correction of the meridional image surface in the intermediate focal length to the telephoto positions. In effect, the astigmatism is maintained stable throughout the zooming range. Another advantage arising from the use of such constructional feature is that the variation of the spherical aberration can also be reduced.

BRIEF DESCRIPTION OF THE DRAWINGS

FIGS. 6A, 6B, 6C to 11A, 11B, 11C are graphic representations of the various aberrations of the lenses of numerical examples 1 to 6, respectively.

DETAILED DESCRIPTION OF THE PREFERRED EMBODIMENT

Figure 1:
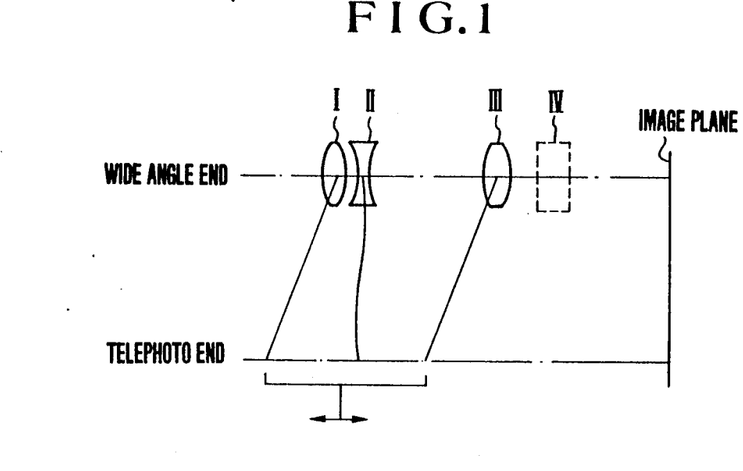
FIG. 1 is a schematic diagram of the paraxial arrangement of an embodiment of a zoom lens according to the invention along with motion of all the zoom lens units.
Figure 2:
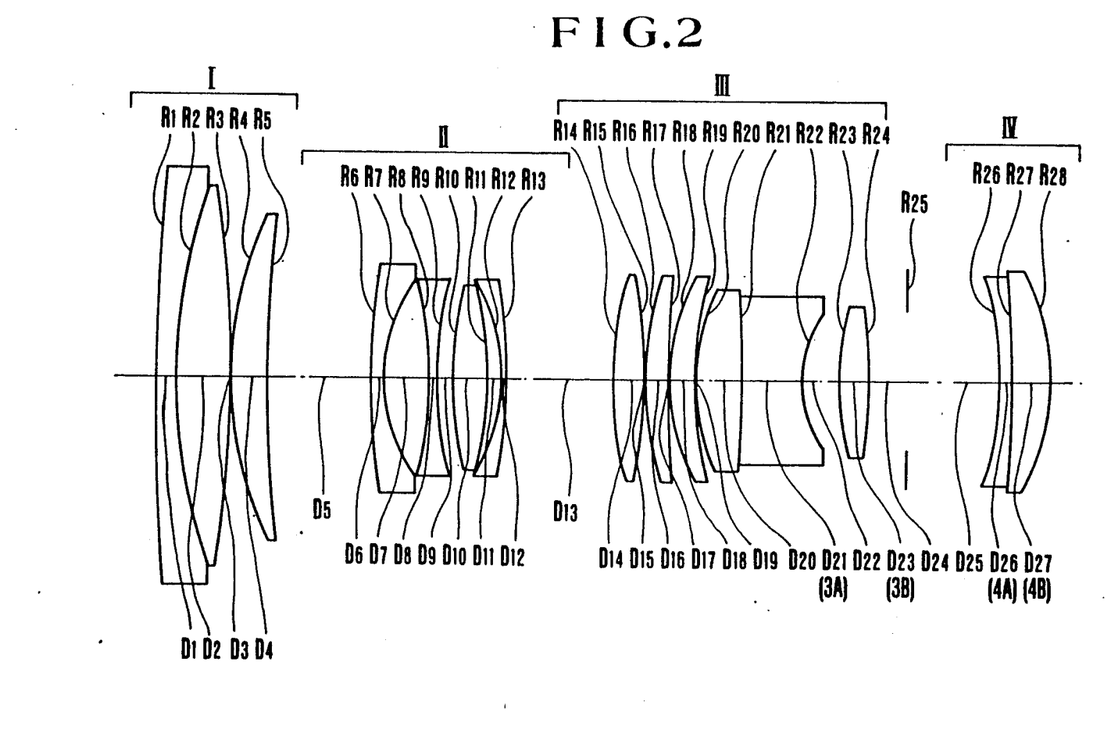
FIGS. 2 to 5 are longitudinal section views of numerical examples 1 to 4 of specific zoom lenses of the invention.

In FIG. 1 there is shown one embodiment of the zoom lens according to the invention wherein I, II, III and IV denote the first, second, third and fourth lens units, respectively, the arrangement of their refractive powers being determined by the above-stated conditions (1) to (6). Under such conditions, when zooming from the wide angle end to the telephoto end, the first and third lens units I and III are axially moved forward at the same speed, while the second lens unit II is axially moved non-linearly relative to the movement of the first and third lens units I and III.

Such forward movement of the first lens unit I changes the position of an object point for the second lens unit II in such a way that despite reduction of the total zooming movement of the second lens unit II, the separation between the first and second lens units can be varied to large extent. It is, therefore, possible to extend the varifocal range of the entire zoom lens system.

Thus, making the first lens unit movable forward when zooming from the wide angle end to the telephoto end allows the second lens unit also partake in the varifocal action, contributing to an increase of the range.

Also, by making the third lens unit movable forward, varying the image magnification is contributed by the third unit. Combining that contribution with the contribution of the first lens unit, a high range zoom lens is realized.

It should be recognized that in the present invention, a valuable increase in the varifocal range is achieved when the first three lens units move in such a way as to each add an image magnification varying effect to those of the other lens units at any time during zooming.

Additionally, in the present invention, because the first and third lens units may be secured to each other, an operating mechanism for the zoom lens can be constructed in so simple a form as that for the so-called 2-component zoom lens, despite the range being far greater than that of the latter. Moreover, imparting a forward movement to the first lens unit creates a sufficiently large space to allow for relative movement of the second lens unit, while the axial separation between the second and third lens units is reduced. This decreases the height of incidence of an oblique pencil of rays on the first lens unit from the optical axis, with the advantage of preventing production of higher order aberrations. Thus, the requirement of achieving a great increase in the angular field of view is made compatible with the requirements of achieving good stability of aberration correction over the entire zooming range and of minimizing the bulk and size of the entire zoom lens system.

The significance of each of the above-stated conditions (1) to (6) will next be explained.

Inequalities of condition (1) are concerned with the refractive power of the first lens unit and are given for the purpose of reducing the variation of aberrations with zooming and allowing the second lens unit to produce a prescribed varifocal effect. When the lower limit is exceeded, the variation of aberrations with zooming increases, and the sensitivity of the image shift to the axial deviation of the first lens unit increases with increase in the severeness of tolerances. When the upper limit is exceeded, the total zooming movement of the first lens unit increases. As a result, the diameter of the first lens unit increases. Further, the axial separation between the second and third lens units in the wide angle end increases, causing the total length of the lens to increase objectionably. Particularly, when the diaphragm is positioned in the third lens unit, the increase in the separation between the second and third lens units calls for an increase in the diameter of the first lens unit. Otherwise, an oblique beam as large as the axial beam could not be admitted in the wide angle positions.

Meanwhile, even when the first lens unit is used for focusing purposes, it is preferred to satisfy the condition (1) for good stability of aberration correction throughout the entire focusing range. When the lower limit is exceeded, the spherical aberration and curvature of field vary largely with focusing in the telephoto positions. These aberrations are difficult to correct. When the upper limit is exceeded, the total focusing movement increases so much that it is difficult to admit an oblique beam as large as the axial beam for a close object in the wide angle positions. To avoid this, the diameter of the first lens unit increases objectionably.

Inequalities of condition (2) concern the refractive power of the second lens unit. When its refractive power is too strong beyond the lower limit, the variation of distortion with zooming increases. Particularly with an infinitely distant object, the negative distortion increases extremely in the wide angle positions. Further, the second lens unit becomes difficult to correct for spherical aberration. In the telephoto positions, therefore, extreme over-correction of spherical aberration results.

When the refractive power of the second lens unit is too weak beyond the upper limit, as the varifocal effect of the second lens unit lessens, the total zooming movement of the first and third lens units increases with the result of an increase in the total length of the 3 mm lens. The total zooming movement of the second lens unit also increases, and the separation between the second and third lens units increases. To admit an oblique beam as large as the axial beam, therefore, the diameters of the first and second lens units increase objectionably.

Inequalities of condition (3) concern the refractive power of the third lens unit. When its refractive power is too strong beyond the lower limit, the variation of aberrations with zooming increases. Particularly in the telephoto positions, the spherical aberration increases largely. When the upper limit is exceeded, as the refractive power weakens, the back focal distance of the zoom lens increases, causing the total length of the 3 mm lens to increase objectionably.

Further, in the present invention, in order to correct the aberrations over the entire area of the picture frame, it is preferred to construct the third lens unit with, from front to rear, three lenses constructed, respectively, of positive power, a cemented lens of positive and negative elements with its rear surface of concave curvature toward the rear, and an aspherical bi-convex lens of positive power.

By using such a lens design, the rays of light incident on the third lens unit can be refracted in nearly aplanatic condition so that the amount of spherical aberration produced can be lessened.

Preferably, the aspherical lens 3B of the third lens unit is constructed in the form of a doublet consisting of positive and negative lenses cemented together, because the degree of freedom for the aberrational problem increases, the variation of chromatic aberrations with zooming is lessened, and the Petzval sum is corrected for good image quality.

Inequalities of conditions (4) and (5) concern the refractive power of the fourth lens unit. When condition (4) is violated, as a strong negative refractive power results, the variation of astigmatism with zooming increases. Particularly in the wide angle positions, the meridional image surface is over-corrected objectionably.

When condition (5) is violated, good stability of spherical aberration is difficult to perform. Also, the back focal distance of the zoom lens becomes too long, causing the total length of the zoom lens to increase objectionably.

Inequalities of condition (6) concern the image magnification of the second lens unit in the telephoto end, and its factor represents that fraction of the zoom ratio which is borne by the second lens unit to extend the range of the zoom lens. When the image magnification decreases below the lower limit, or operates in a range of smaller values than unity $(-1X)$, the separation between the first and second lens units increases in the telephoto end to obtain a certain zoom ratio. As a result, the total zooming movement of each of the first three lens units increases. To avoid mechanical interference between the successive two lens units, therefore, the physical length of the zoom lens must be increased.

Further, the separation between the second and third lens units increases. If the diaphragm lies, for example, near the third lens unit, the distance from the diaphragm to the first lens unit, therefore, becomes very long. To permit passage of as large an oblique beam as the axial beam through the first lens unit, its diameter must be increased.

The upper limit of condition (6) represents a critical value for assuring the fundamental condition that the first and third lens units move in unison to vary the image magnification. When this upper limit, or the unity of magnification, is exceeded, it is impossible to continuously vary the focal length of the zoom lens.

When the thus-defined conditions are satisfied, a compact zoom lens of a field angle of 62° and a zoom ratio of 3.7 well corrected for aberrations is attained.

Focusing of the zoom lens of the invention may be performed either by moving the first lens unit alone, as has been mentioned above, or along with the third lens. Another usable focusing method is to move the fourth lens unit in part or as a whole, since the variation of aberration with focusing is small.

In the present invention, for assisting in extending the varifocal range and achieving good stability of aberration correction throughout the extended zooming range, it is preferred that the diaphragm is positioned behind the third lens unit and is movable either in unison with the third lens unit, or independently thereof.

Next, the effect of the aspherical surface of the invention on the aberration correction is explained by reference to "Lens Design" by MATSUI Yoshiya, starting at page 41, from Kyoritsu Publication Co.

Using parameters h and $\bar{h}$ in tracing the paraxial ray and the paraxial pupil ray on the aspherical surface, the third order spherical aberration, comatic aberration and astigmatic aberration may be expressed by coefficients I, II and III, respectively, as follows:

$$I = I0 + h^4 \psi$$

$$II = II0 + h^3 \bar{h} \psi$$

$$III = III0 + h^2 \bar{h}^2 \psi$$

where $\psi$ is the aspherical quantity defined in "Lens Design", and I0, II0 and III0 are the coefficients or the spherical aberration, coma and astigmatism of the entire system, respectively, when the aspherical surface is replaced by a spherical surface of the same curvature as the paraxial curvature. Here, for example, the diaphragm is assumed to lie in front of the third lens unit. Then, the traced values of h and $\bar{h}$ both become positive. When an aspherical surface, having a negative refracting action in the third order aberration domain, is placed in the third lens unit, the aspherical quantity becomes $\psi < 0$. Therefore, because of h, $\bar{h} > 0$, the spherical aberration, coma and astigmatism can each be minimized in the coefficient. For this reason, the variation with zooming of aberrations, due to the positive refractive power of the third lens unit, can be reduced.

Particularly, in the present invention it is preferred to figure the aspherical surface so as to satisfy the following condition:

$$0 < -\psi < 2 \times f_W^3 \quad (7)$$

where fW is the shortest focal length of the entire zoom lens system. Here, the lower limit of condition (7) represents that the aspherical quantity has a negative refracting effect in the third order aberration domain. When the upper limit is exceeded, over-correction of the astigmatic aberration coefficient and over-correction of the meridional image surface result in the wide angle positions. Also, as the image magnification changes, the aberration correction is deteriorated in balance. Particularly, the spherical aberration in the telephoto positions are over-corrected objectionably.

Further assistance in having, despite the varifocal range is greatly extended, to achive good stability of aberration correction throughout the extended range, can be obtained when the second lens unit is constructed with, from front to rear, a negative meniscus lens of forward convexity, a bi-concave lens, a bi-convex lens and a negative meniscus lens of rearward convexity. When zooming from the wide angle end to the telephoto end, the first and third lens units are axially moved forward, and the second lens unit is axially moved non-linearly thereto to maintain constant the position of the image plane. It is preferred that the second lens unit moves rearward when zooming near the wide angle end, and then forward when zooming near the intermediate focal length positions, and then rearward when zooming near the telephoto end.

To achieve further improvements of the stabilization of the aberrations, it is preferred to set forth the following features:

(a) The first lens unit is constructed with three lenses, of which the first, counting from the front, is a negative meniscus lens 11 of forward convexity, the second is a positive lens 12 with its front surface of strong convex curvature toward the front, and the third is a positive meniscus lens 13 of forward convexity, satisfying the following conditions:

$$\nu ln < 30 \quad (8)$$

$$\nu lp > 50 \quad (9)$$

where $\nu ln$ is the Abbe number of the negative lens 11 and $\nu lp$ is the mean Abbe number of the two positive lenses 12 and 13.

(b) The second lens unit is constructed with, from front to rear, a negative lens 21 with its rear surface of concave curvature toward the rear, a bi-concave lens 22 and a positive lens 23, satisfying the following conditions:

$$R7 < |R8| < R9 \quad (10)$$

$$R10 < R9 \quad (11)$$

where R7 is the radius of curvature of the rear surface of the negative lens 21, R8 and R9 are the radii of curvature of the front and rear surfaces of the negative lens 22, and R10 is the radius of curvature of the front surface of the positive lens 23.

(c) The third lens unit is constructed with, from front to rear, three positive lenses 31, 32 and 33, a bi-concave lens 34 and a positive lens 36, the bi-concave lens 34 being formed so that the concave surfaces thereof have the smallest radii of curvature within the third lens unit, and the front surfaces of the first three positive lenses 31, 32 and 33 having the radii of curvature R14, R16 and R18, respectively, in the following relationship:

$$R14 > R16 > R18 \quad (12)$$

(d) The fourth lens unit is constructed with two lenses, of which the first, counting from the front, is a negative lens 41 and the second is a positive lens 42, the refractive index of the negative lens 41 being higher than that of the positive lens 42, and the rear surface of the positive lens 42 being formed with a convex curvature toward the rear.

By using three lenses for constituting the first lens unit, the spherical aberration produced by the first lens unit in the telephoto positions is reduced. Also the air lens, formed between the positive lens 13 and the negative lens 21 of the second lens unit, is used for correcting distortion in the wide angle positions. In the specific embodiments to be described later, the negative lens 11 and the positive lens 12 are cemented together, but without using the cemented contact, the first lens unit can be corrected for spherical aberration. To stabilize chromatic aberrations against zooming and focusing, the negative lens 11 has a smaller Abbe number $\nu ln$ than 30, and the two positive lenses 12 and 13 have a means Abbe number $\nu lp$ of larger than 50. When these features fall outside the ranges, the variation of chromatic aberrations with zooming is increased. Particularly in the telephoto positions, large under-corrosion of longitudinal chromatic aberration and large over-correction of lateral chromatic aberration result. These chromatic aberrations are difficult to correct by the other lens units.

Inequalities of conditions (10) and (11) concern with the second lens unit and are given for the purpose of maintaining stable the various aberrations against zooming and focusing. When the lower limit of condition (10) is exceeded, the off-axis aberrations, particularly astigmatism and distortion in the wide angle positions, are difficult to correct. With an infinitely distant object, when in the wide angle positions, the meridional image surface is over-corrected, and the distortion is under-corrected. When the first lens unit is moved to effect focusing down to a finite object distance, because the positive lenses 12 and 13 of the first lens unit move farther away from the diaphragm, the effect of the positive lenses 12 and 13 becomes so strong that the meridional image surface changes to being under-corrected, and the distortion to being over-corrected.

Also since the height $\bar{h}$ of incidence of the principal ray of the oblique pencil on the frontmost surface of the second lens unit from the optical axis is generally high when in the wide angle positions, the violation of the lower limit of condition (10) intensifies the over-correction of the meridional image surface and the under-correction of the distortion with the infinitely distant object when in the wide angle positions.

The upper limit of condition (10) concerns the form of the negative lens 22. When this condition is violated, the rear surface of the negative lens 22 produces large spherical aberration and sagittal flare. The variation of spherical aberration of the second lens unit, with zooming, is also increased. The spherical aberration in positions near the telephoto end is corrected by the positive lens 23.

An inequality of condition (11) represents that the front lens surface of the positive lens 23 is smaller in the radius of curvature than the rear lens surface of the negative lens 22. When this condition is satisfied, the variation of spherical aberration with zooming is minimized.

It should be noted that in the present invention, a negative meniscus lens of rearward convexity is preferably added to the rear of the positive lens 23 with advantages that the amount of spherical aberration produced is minimized and a negative air lens, formed between the positive lens 23 and the negative lens 24, is usable for correcting the image aberrations when in the telephoto positions.

Inequalities of condition (12) are given for minimizing the amount of spherical aberration produced by the third lens unit. When the radii of curvature of the front surfaces of the three positive lenses fall in the ranges given by the condition (12), the third lens unit is corrected for spherical aberration. Another advantage is that because the front principal point of the third lens unit is brought forward, the interval between the principal points of the second and third lens units is shortened, contributing to a minimization of the size of the entire zoom lens system.

The third lens unit is included with the negative lens 34, thereby the spherical aberration and coma produced by the positive lenses 31, 32 and 33 are better corrected. The over-corrected spherical aberration by the negative lens 34 is corrected by adding the positive lens 36 so that the spherical aberration ascribable to the third lens unit is maintained stable against zooming.

To achieve further improvements of the stabilization of the spherical aberration, the positive lenses 31, 32 and 33 are formed so that their rear surfaces have radii of curvature R15, R17 and R19 in the following relationships:

$$1/R15 < 1/R17 < 1/R19 \quad (13)$$

It is prefered to construct at least one of the positive lenses 31, 32 and 33 in the form of a doublet with an advantage of correcting chromatic aberrations. In this case, if the front and rear surfaces of the doublet are configured so as to satisfy the conditions (12) and (13), an equivalent advantage to that described above can be obtained.

The negative lens 34 may be constructed in the form of either a singlet, or a doublet consisting of positive and negative lenses with the overall power being negative.

The positive lens 36 may be constructed in the form of a doublet consisting of positive and negative lenses cemented together with an advantage of minimizing the Petzval sum.

When the fourth lens is designed in such a way as described above, the image aberrations, particularly the meridional image surface in the telephoto positions, are corrected under the conditions (4) and (5).

The negative lens 41 and the positive lens 42 may be constructed in the form of doublets.

To further improve the stabilization of the aberrations against zooming, besides the above-stated various conditions, it is preferred to set forth an additional feature that the second lens unit is constructed with negative, negative, positive and negative lenses in this order from the front.

For assisting in good stability of chromatic aberrations throughout the entire zooming range, it is preferred to construct the fourth lens unit with a doublet of negative and positive lenses cemented together.

To correct the aberrations for good image quality over the entire area of the picture frame, it is preferred to make aspherical at least one surface of the third lens unit.

Numerical examples of specific zoom lenses of the invention can be constructed in accordance with the numerical data given in the following tables for the radii of curvature, R, the axial thicknesses and air separations, D, and the refractive indices, N, and Abbe numbers, $\nu$, of the glasses of the lens elements with the subscripts numbered consecutively from front to rear.

In these examples, the aspherical surface is configured using the following equation:

$$x = \frac{\left(\frac{1}{R}\right) y^2}{1 + \sqrt{1 - \left(\frac{y}{R}\right)^2}} + By^4 + Cy^6 + Dy^8$$

where R is the radius of curvature of the paraxial region, X-axis is in the optical axis (the direction in which light advances is taken as positive), Y-axis is in a direction perpendicular to the optical axis, and B, C and D are the aspherical coefficients.

Numerical Example 1 (FIGS. 2, 6A-6C)
F = 36.0-132  FNO = 1:3.5-4.5  2ω = 62°-18.6°

| | | | |
|---|---|---|---|
| R1 = 265.56 | D1 = 2.20 | N1 = 1.805180 | ν1 = 25.40 |
| R2 = 66.49 | D2 = 7.10 | N2 = 1.651600 | ν2 = 58.60 |
| R3 = −192.93 | D3 = 0.12 | | |
| R4 = 47.39 | D4 = 4.30 | N3 = 1.696800 | ν3 = 55.50 |
| R5 = 136.92 | D5 = variable | | |
| R6 = 95.05 | D6 = 1.40 | N4 = 1.883000 | ν4 = 40.80 |
| R7 = 19.84 | D7 = 5.95 | | |
| R8 = −38.35 | D8 = 1.20 | N5 = 1.883000 | ν5 = 40.80 |
| R9 = 83.26 | D9 = 1.56 | | |
| R10 = 47.08 | D10 = 4.80 | N6 = 1.846660 | ν6 = 23.90 |
| R11 = −39.21 | D11 = 0.90 | | |
| R12 = −27.34 | D12 = 1.05 | N7 = 1.816000 | ν7 = 46.60 |
| R13 = −84.72 | D13 = variable | | |
| R14 = 51.74 | D14 = 3.30 | N8 = 1.523010 | ν8 = 50.80 |
| R15 = −99.82 | D15 = 0.12 | | |
| R16 = 35.17 | D16 = 3.15 | N9 = 1.523010 | ν9 = 50.80 |
| R17 = 96.16 | D17 = 0.20 | | |
| R18 = 26.49 | D18 = 3.25 | N10 = 1.531720 | ν10 = 48.90 |

Numerical Example 1 (FIGS. 2, 6A-6C)
F = 36.0-132  FNO = 1:3.5-4.5  2ω = 62°-18.6°

| | | | |
|---|---|---|---|
| R19 = 43.24 | D19 = 0.20 | | |
| R20 = 25.83 | D20 = 5.89 | N11 = 1.517420 | ν11 = 52.40 |
| R21 = −113.78 | D21 = 7.40 | N12 = 1.846660 | ν12 = 23.90 |
| R22 = 14.76 | D22 = 4.51 | | |
| R23 = 34.13 | D23 = 3.50 | N13 = 1.639800 | ν13 = 34.50 |
| R24 = −90.62 | D24 = variable | | |
| (aspherical surface) | | | |
| R25 = diaphragm | D25 = variable | | |
| R26 = −40.76 | D26 = 1.00 | N14 = 1.834810 | ν14 = 42.70 |
| R27 = −281.74 | D27 = 5.00 | N15 = 1.523010 | ν15 = 50.80 |
| R28 = −28.97 | | | |

| | f | | |
|---|---|---|---|
| D | 36.0 | 68.0 | 132.0 |
| D5 | 0.80 | 12.83 | 24.13 |
| D13 | 25.77 | 13.74 | 2.45 |
| D24 | 0 | 4.66 | 9.37 |
| D25 | 3.17 | 11.61 | 20.01 |

$B = 6.34845 \times 10^{-7}$
$C = -2.31141 \times 10^{-8}$
$D = -1.86413 \times 10^{-10}$

Figure 3:
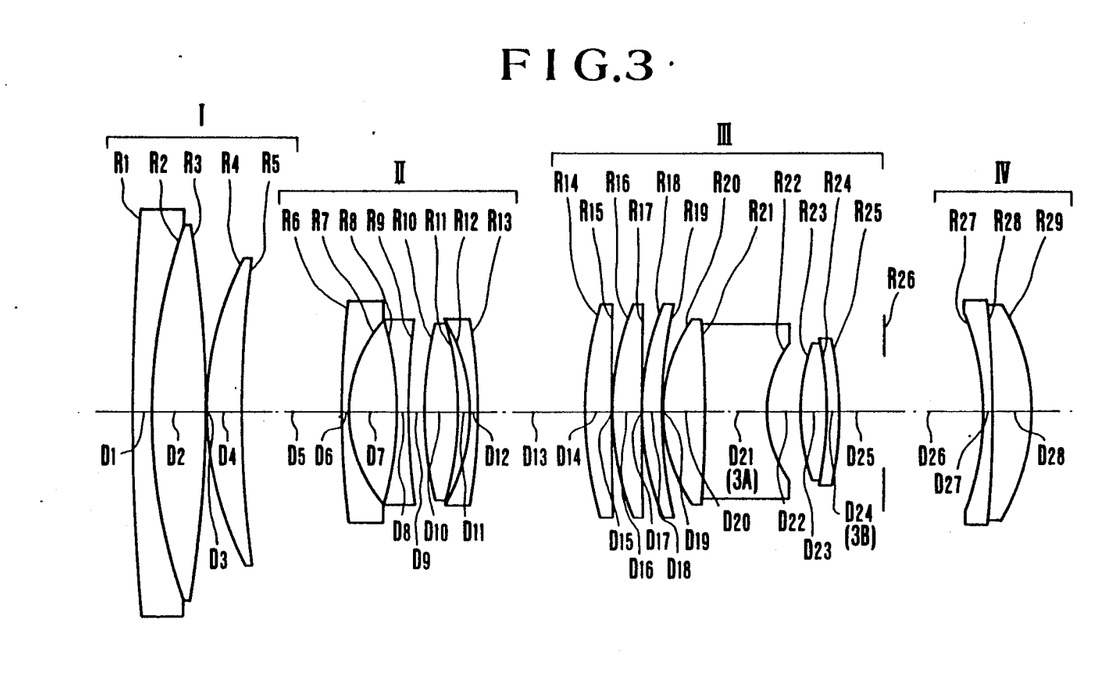
Figure 4:
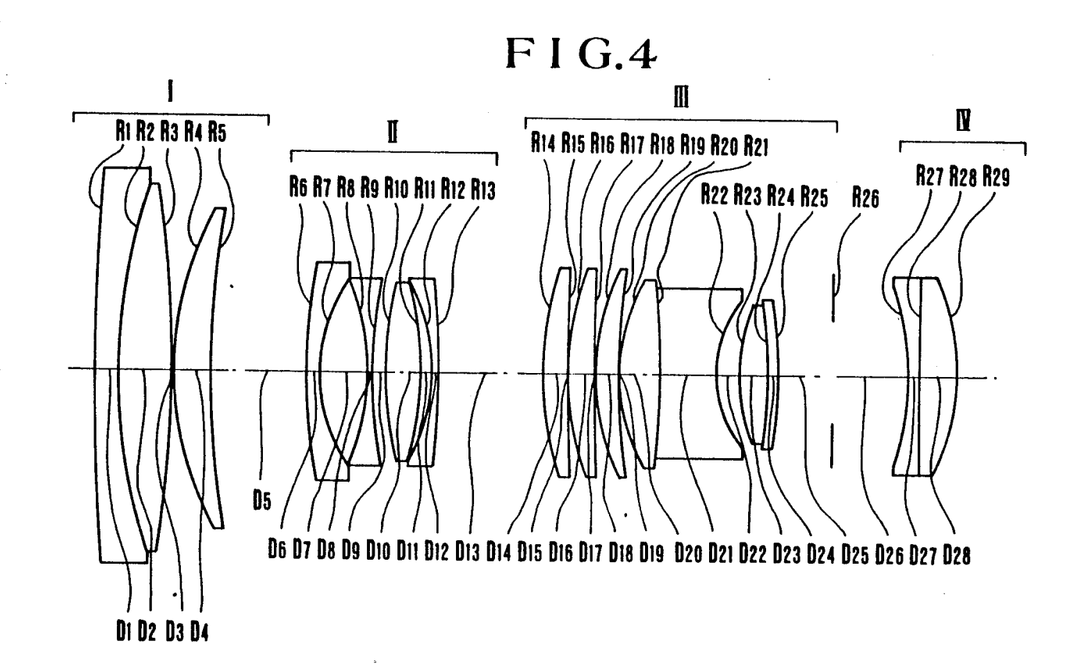
Figure 5:
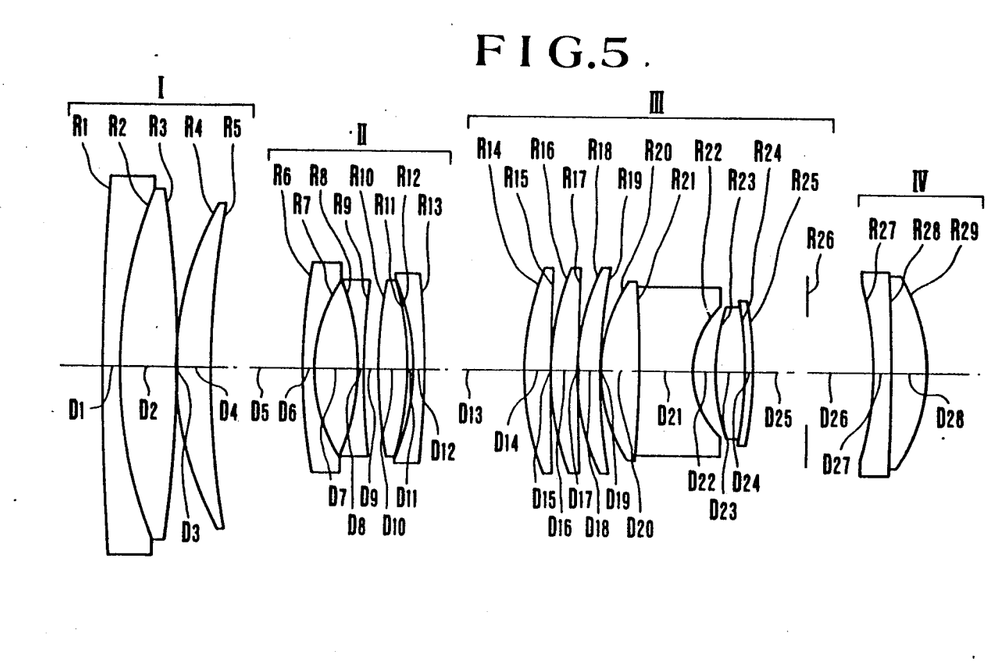
Figure 6A:
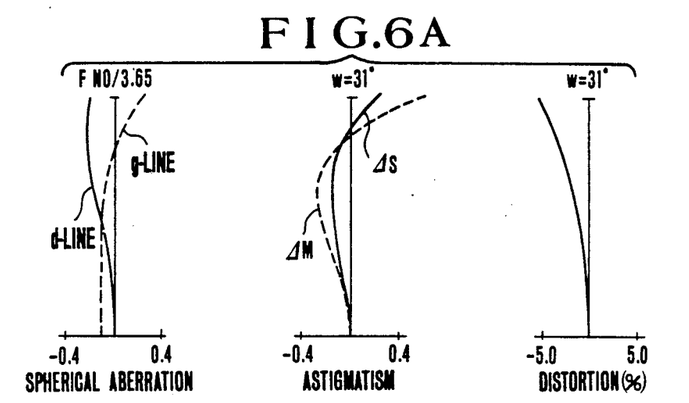
Figure 6B:
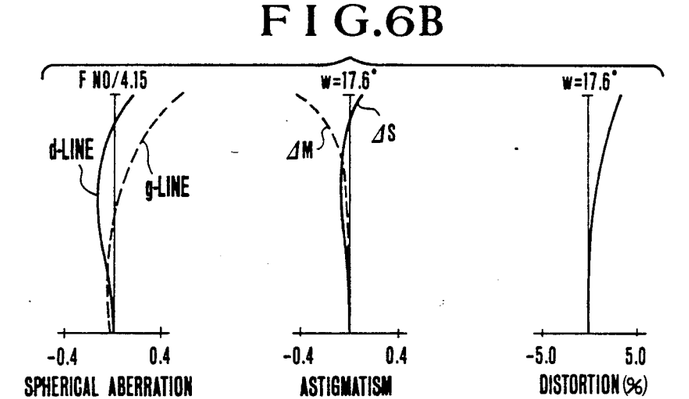
Figure 6C:
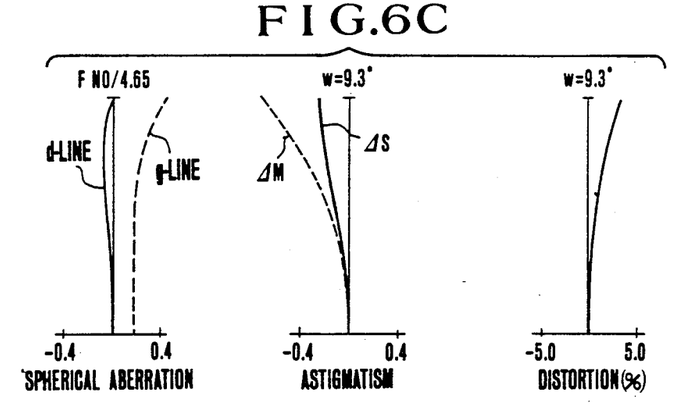
Figure 7A:
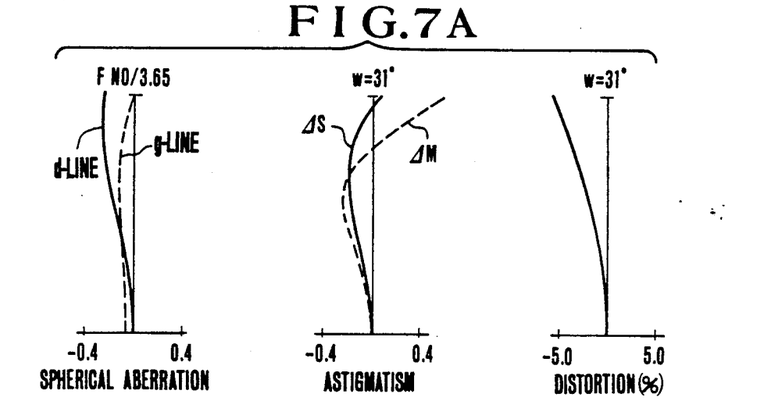
Figure 7B:
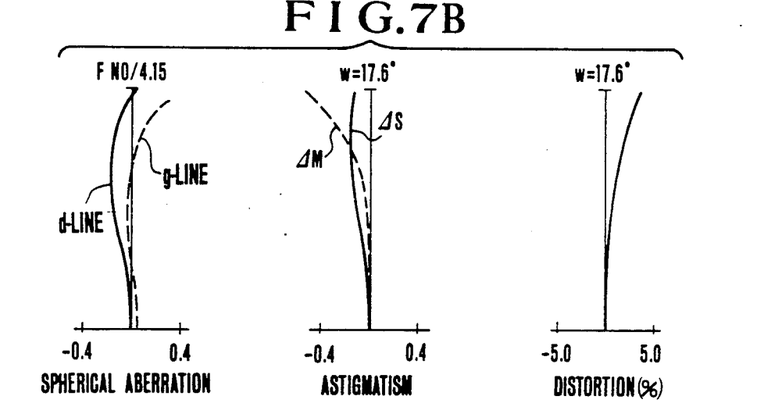
Figure 7C:
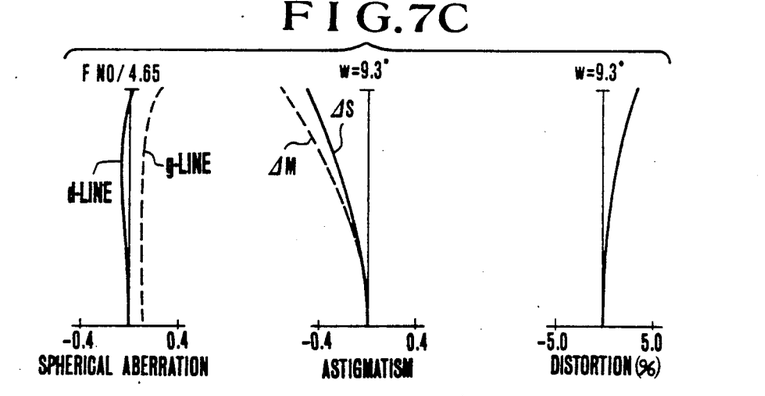
Figure 8A:
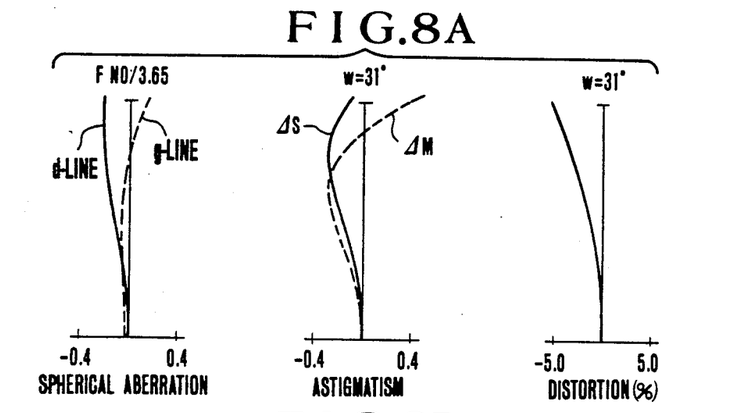
Figure 8B:
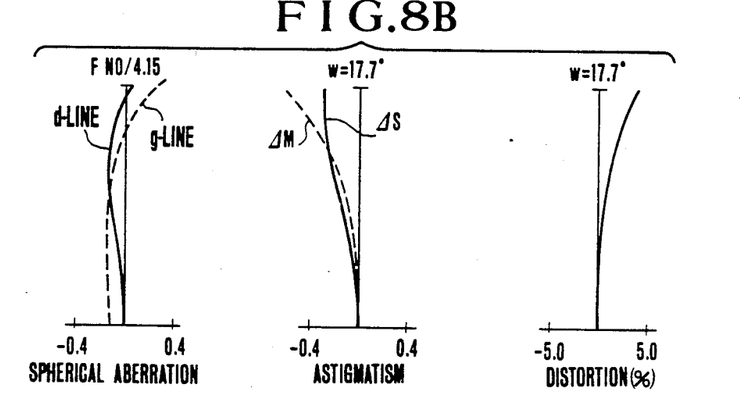
Figure 8C:
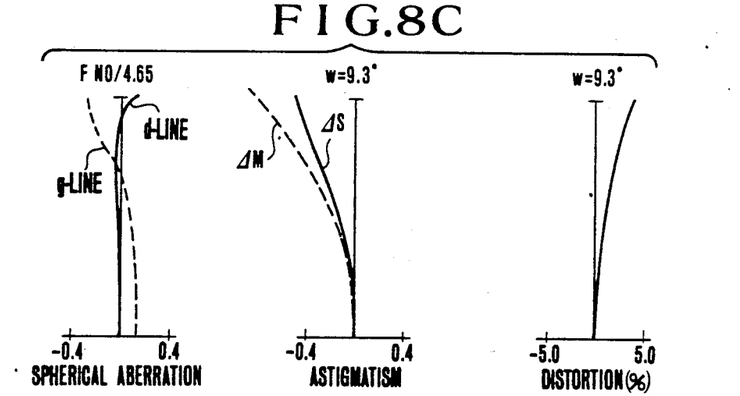
Figure 9A:
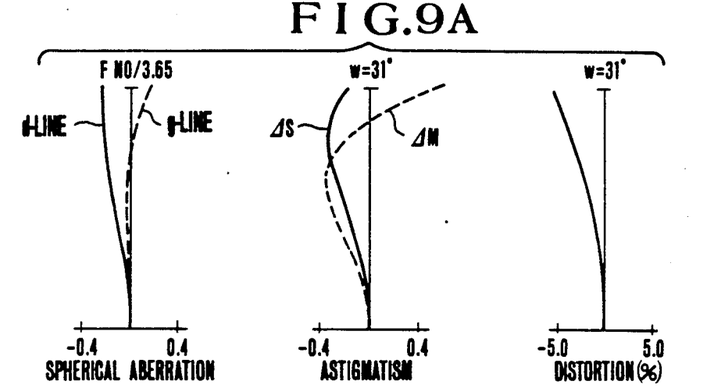
Figure 9B:
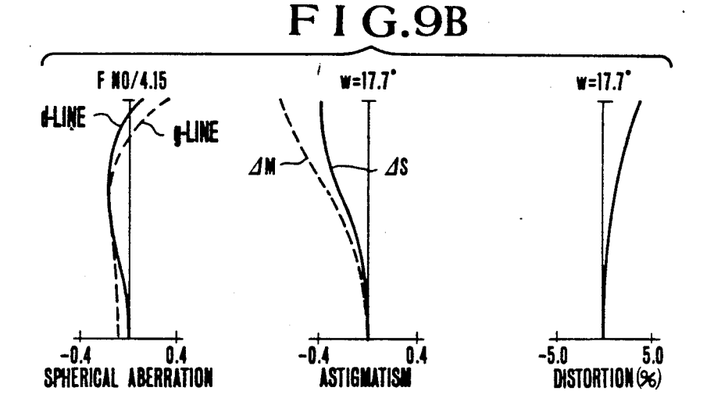
Figure 9C:
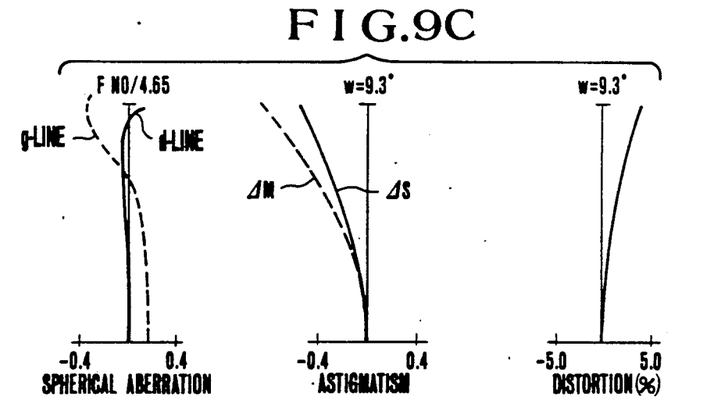
Figure 10A:
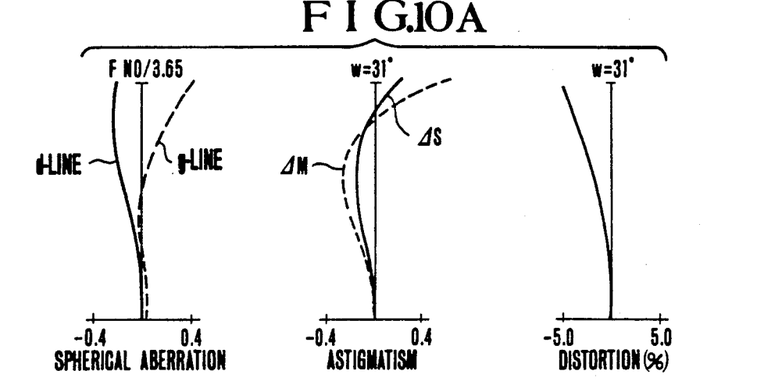
Figure 10B:
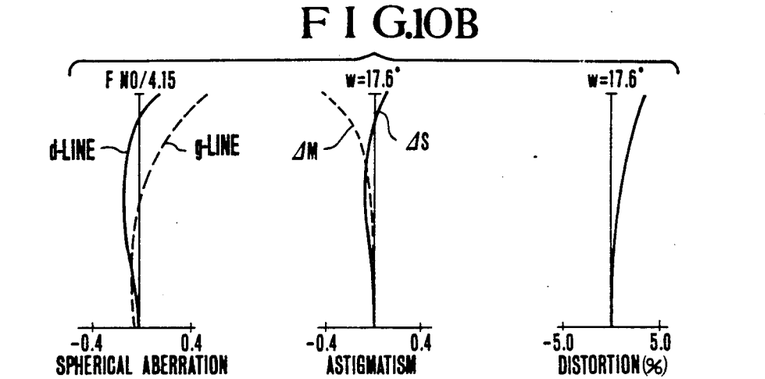
Figure 10C:
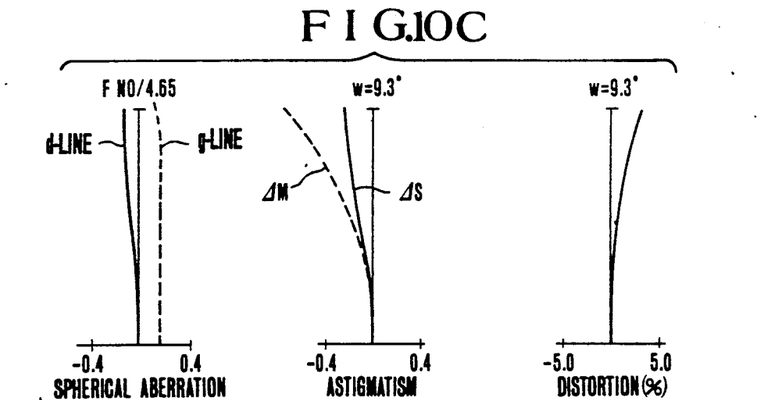
Figure 11A:
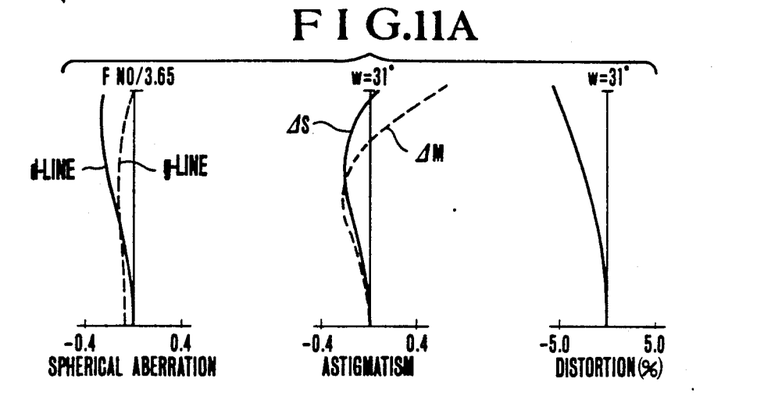
Figure 11B:
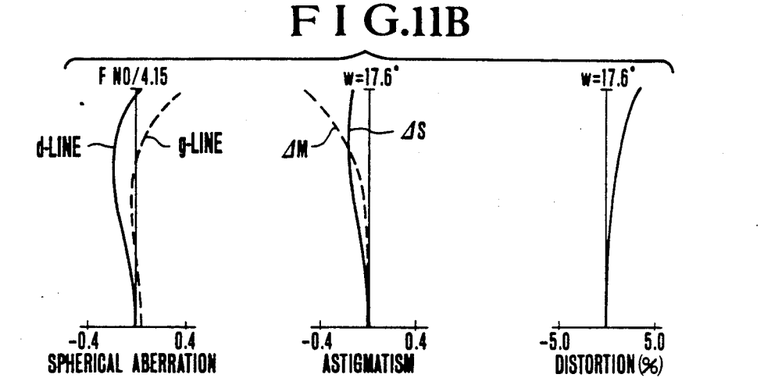
Figure 11C:
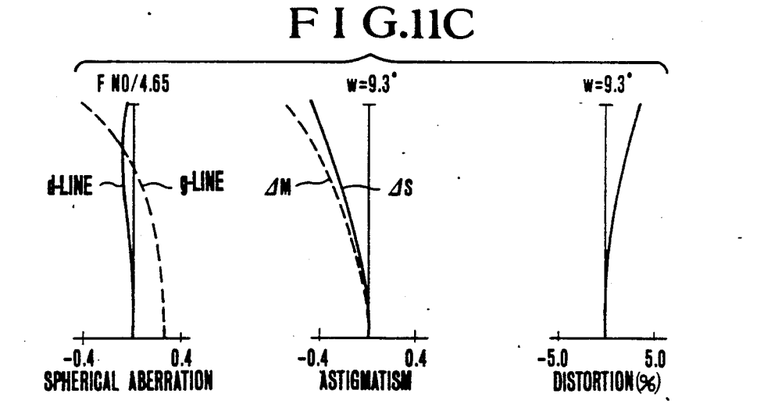

Numerical Example 2 (FIGS. 3, 7A-6C)
F = 36.0-132  FNO = 1:3.5-4.5  2ω = 62°-18.6°

| | | | |
|---|---|---|---|
| R1 = 284.40 | D1 = 2.15 | N1 = 1.80518 | ν1 = 25.4 |
| R2 = 67.68 | D2 = 7.25 | N2 = 1.60311 | ν2 = 60.7 |
| R3 = −140.64 | D3 = 0.12 | | |
| R4 = 44.19 | D4 = 4.40 | N3 = 1.69680 | ν3 = 55.5 |
| R5 = 118.11 | D5 = variable | | |
| R6 = 104.76 | D6 = 1.30 | N4 = 1.88300 | ν4 = 40.8 |
| R7 = 20.42 | D7 = 5.65 | | |
| R8 = −40.60 | D8 = 1.15 | N5 = 1.88300 | ν5 = 40.8 |
| R9 = 74.65 | D9 = 2.00 | | |
| R10 = 47.25 | D10 = 4.60 | N6 = 1.84666 | ν6 = 23.9 |
| R11 = −40.50 | D11 = 0.96 | | |
| R12 = −26.79 | D12 = 1.00 | N7 = 1.77250 | ν7 = 49.6 |
| R13 = −99.44 | D13 = variable | | |
| R14 = 51.82 | D14 = 3.20 | N8 = 1.60311 | ν8 = 60.7 |
| R15 = −4730.00 | D15 = 0.20 | | |
| R16 = 37.34 | D16 = 3.55 | N9 = 1.06311 | ν9 = 60.7 |
| R17 = 491.77 | D17 = 0.15 | | |
| R18 = 35.81 | D18 = 2.69 | N10 = 1.51633 | ν10 = 64.1 |
| R19 = 65.11 | D19 = 0.15 | | |
| R20 = 22.51 | D20 = 5.31 | N11 = 1.48749 | ν11 = 70.1 |
| R21 = −190.84 | D21 = 7.57 | N12 = 1.85026 | ν12 = 32.3 |
| R22 = 14.80 | D22 = 4.14 | | |
| R23 = 32.32 | D23 = 3.54 | N13 = 1.57309 | ν13 = 42.6 |
| R24 = −33.78 | D24 = 0.99 | N14 = 1.84666 | ν14 = 23.9 |
| R25 = −60.23 | D25 = variable | | |
| (aspherical surface) | | | |
| R26 = (diaphragm) | D26 = variable | | |
| R27 = −35.99 | D27 = 0.98 | N15 = 1.83481 | ν15 = 42.7 |
| R28 = −171.74 | D28 = 4.88 | N16 = 1.53172 | ν16 = 48.9 |
| R29 = −27.61 | | | |

| | f | | |
|---|---|---|---|
| D | 36 | 68 | 132 |
| D5 | 0.47 | 12.20 | 23.22 |
| D13 | 25.17 | 13.43 | 2.42 |
| D25 | 1.02 | 5.60 | 3.20 |
| D26 | 4.13 | 12.32 | 22.50 |

$B = 2.73509 \times 10^{-6}$
$C = -1.54247 \times 10^{-8}$
$D = -7.35035 \times 10^{-11}$

Numerical Example 3 (FIGS. 4, 8A-8C)
F = 36.3-131.6  FNO = 1:3.5-4.5  2ω = 62°-18.6°

| | | | |
|---|---|---|---|
| R1 = 355.67 | D1 = 2.15 | N1 = 1.80518 | ν1 = 25.4 |
| R2 = 62.51 | D2 = 7.30 | N2 = 1.65160 | ν2 = 58.6 |
| R3 = −156.09 | D3 = 0.10 | | |
| R4 = 44.08 | D4 = 4.47 | N3 = 1.69680 | ν3 = 55.5 |
| R5 = 126.20 | D5 = variable | | |
| R6 = 82.96 | D6 = 1.23 | N4 = 1.88300 | ν4 = 40.8 |
| R7 = 19.09 | D7 = 5.75 | | |
| R8 = −33.99 | D8 = 1.08 | N5 = 1.83481 | ν5 = 42.7 |
| R9 = 84.48 | D9 = 1.59 | | |
| R10 = 47.37 | D10 = 4.53 | N6 = 1.84666 | ν6 = 23.9 |
| R11 = −39.89 | D11 = 0.90 | | |
| R12 = −26.40 | D12 = 1.00 | N7 = 1.77250 | ν7 = 49.6 |
| R13 = −91.91 | D13 = variable | | |
| R14 = 40.33 | D14 = 3.10 | N8 = 1.48749 | ν8 = 70.1 |
| R15 = 408.37 | D15 = 0.12 | | |
| R16 = 38.66 | D16 = 3.30 | N9 = 1.61700 | ν9 = 62.8 |
| R17 = 210.97 | D17 = 0.19 | | |
| R18 = 29.16 | D18 = 3.00 | N10 = 1.48749 | ν10 = 70.1 |
| R19 = 70.79 | D19 = 0.14 | | |
| R20 = 23.67 | D20 = 5.10 | N11 = 1.49700 | ν11 = 81.6 |
| R21 = −121.74 | D21 = 6.87 | N12 = 1.83400 | ν12 = 37.2 |
| R22 = 14.28 | D22 = 2.63 | | |
| R23 = 25.72 | D23 = 3.64 | N13 = 1.58267 | ν13 = 46.4 |
| R24 = −58.63 | D24 = 1.00 | N14 = 1.84666 | ν14 = 23.9 |
| R25 = −83.34 | D25 = variable | | |
| (aspherical surface) | | | |
| R26 = (diaphragm) | D26 = variable | | |
| R27 = −35.20 | D27 = 1.25 | N15 = 1.76200 | ν15 = 40.1 |
| R28 = −305.84 | D28 = 4.70 | N16 = 1.48749 | ν16 = 70.1 |
| R29 = −26.95 | | | |

| | f | | |
|---|---|---|---|
| D | 36.3 | 67.89 | 131.64 |
| D5 | 0.71 | 11.87 | 22.56 |
| D13 | 24.22 | 13.05 | 2.37 |
| D25 | 0.28 | 7.05 | 8.78 |
| D26 | 4.12 | 9.56 | 20.24 |

$B = 2.735 \times 10^{-6}$
$C = -1.542 \times 10^{-8}$
$D = -7.35 \times 10^{-11}$

Numerical Example 4 (FIGS. 5, 9A-9C)
F = 36.3-131.6  FNO = 1:3.5-4.5  2ω = 62°-18.6°

| | | | |
|---|---|---|---|
| R1 = 271.05 | D1 = 2.00 | N1 = 1.80518 | ν1 = 25.4 |
| R2 = 58.00 | D2 = 7.00 | N2 = 1.65160 | ν2 = 58.6 |
| R3 = −169.66 | D3 = 0.10 | | |
| R4 = 43.51 | D4 = 4.30 | N3 = 1.69680 | ν3 = 55.5 |
| R5 = 135.45 | D5 = Variable | | |
| R6 = 90.90 | D6 = 1.20 | N4 = 1.88300 | ν4 = 40.8 |
| R7 = 18.99 | D7 = 5.50 | | |
| R8 = −34.57 | D8 = 1.00 | N5 = 1.88300 | ν5 = 40.8 |
| R9 = 82.00 | D9 = 1.65 | | |
| R10 = 47.23 | D10 = 4.36 | N6 = 1.84666 | ν6 = 23.9 |
| R11 = −36.75 | D11 = 0.87 | | |
| R12 = −25.35 | D12 = 1.00 | N7 = 1.77250 | ν7 = 49.6 |
| R13 = −90.17 | D13 = Variable | | |
| R14 = 37.74 | D14 = 3.00 | N8 = 1.48749 | ν8 = 70.1 |
| R15 = 269.82 | D15 = 0.10 | | |
| R16 = 37.17 | D16 = 3.20 | N9 = 1.61700 | ν9 = 62.8 |
| R17 = 223.56 | D17 = 0.10 | | |
| R18 = 27.96 | D18 = 2.90 | N10 = 1.48749 | ν10 = 70.1 |
| R19 = 65.93 | D19 = 0.10 | | |
| R20 = 22.92 | D20 = 4.90 | N11 = 1.49700 | ν11 = 81.6 |
| R21 = −120.94 | D21 = 6.67 | N12 = 1.83400 | ν12 = 37.2 |
| R22 = 13.73 | D22 = 2.54 | | |
| R23 = 24.14 | D23 = 3.50 | N13 = 1.58267 | ν13 = 46.4 |
| R24 = −70.61 | D24 = 1.00 | N14 = 1.84666 | ν14 = 23.9 |
| R25 = −91.52 | D25 = variable | | |
| (aspherical surface) | | | |
| R26 = diaphragm | D26 = variable | | |
| R27 = −31.42 | D27 = 1.2 | N15 = 1.76200 | ν15 = 40.1 |

-continued

Numerical Example 4 (FIGS. 5, 9A-9C)
F = 36.3–131.6  FNO = 1:3.5–4.5  2ω = 62°–18.6°

| | | | |
|---|---|---|---|
| R28 = −660.35 | D28 = 4.50 | N16 = 1.48749 | ν16 = 70.1 |
| R29 = −24.34 | | | |

| | f | | |
|---|---|---|---|
| D | 36.3 | 67.9 | 131.6 |
| D5 | 0.69 | 11.44 | 21.73 |
| D13 | 23.35 | 12.60 | 2.32 |
| D25 | 0.28 | 6.80 | 8.46 |
| D26 | 3.97 | 9.20 | 19.47 |

B = 3.47542 × 10⁻⁶
C = −2.65147 × 10⁻⁸
D = −2.38004 × 10⁻¹⁰

Numerical Example 5 (FIGS. 2, 10A-10C)
F = 36.0–132  FNO = 1:3.6–4.6  2ω = 61.7°–18.6°

| | | | |
|---|---|---|---|
| R1 = 190.06 | D1 = 2.50 | N1 = 1.80518 | ν1 = 25.4 |
| R2 = 59.60 | D2 = 6.40 | N2 = 1.65160 | ν2 = 58.6 |
| R3 = −346.45 | D3 = 0.12 | | |
| R4 = 48.56 | D4 = 4.60 | N3 = 1.69680 | ν3 = 55.5 |
| R5 = 168.54 | D5 = Variable | | |
| R6 = 71.54 | D6 = 1.40 | N4 = 1.883 | ν4 = 40.8 |
| R7 = 19.17 | D7 = 6.20 | | |
| R8 = −37.41 | D8 = 1.20 | N5 = 1.883 | ν5 = 40.8 |
| R9 = 68.81 | D9 = 2.06 | | |
| R10 = 47.54 | D10 = 5 | N6 = 1.84666 | ν6 = 23.9 |
| R11 = −39.51 | D11 = 0.95 | | |
| R12 = −27.61 | D12 = 1.05 | N7 = 1.804 | ν7 = 46.6 |
| R13 = −85.85 | D13 = Variable | | |
| R14 = 49.81 | D14 = 3.00 | N8 = 1.51118 | ν8 = 51.0 |
| R15 = −432.60 | D15 = 0.12 | | |
| R16 = 33.63 | D16 = 3.35 | N9 = 1.51118 | ν9 = 51.0 |
| R17 = 185.16 | D17 = 0.20 | | |
| R18 = 28.43 | D18 = 3.35 | N10 = 1.51118 | ν10 = 51.0 |
| R19 = 55.07 | D19 = 0.20 | | |
| R20 = 26.42 | D20 = 5.50 | N11 = 1.51742 | ν11 = 52.4 |
| R21 = −138.21 | D21 = 7.14 | N12 = 1.84666 | ν12 = 23.9 |
| R22 = 15.27 | D22 = 4.52 | | |
| R23 = 30.60 | D23 = 3.55 | N13 = 1.64769 | ν13 = 33.8 |
| R24 = −122.38 | D24 = Variable | | |
| (aspherical surface) | | | |
| R25 = diaphragm | D25 = Variable | | |
| R26 = −42.18 | D26 = 1.00 | N14 = 1.816 | ν14 = 46.6 |
| R27 = −380.32 | D27 = 5.00 | N15 = 1.48749 | ν15 = 70.1 |
| R28 = −30.25 | | | |

| f | 36.0 | 68.1 | 132.0 |
|---|---|---|---|
| D5 | 0.57 | 12.78 | 24.16 |
| D13 | 24.93 | 12.73 | 1.44 |
| D24 | 0.30 | 4.44 | 8.57 |
| D25 | 3.09 | 11.49 | 19.89 |

A = 0
B = 5.5535 × 10⁻⁶
C = −9.3451 × 10⁻⁹
D = −7.2476 × 10⁻¹¹
E = 0

Numerical Example 6 (FIGS. 3, 11A-11C)
F = 36.0–132  FNO = 1:3.6–4.6  2ω = 67.1°–18.6°

| | | | |
|---|---|---|---|
| R1 = 318.08 | D1 = 2.15 | N1 = 1.80518 | ν1 = 25.4 |
| R2 = 67.95 | D2 = 7.00 | N2 = 1.65160 | ν2 = 58.6 |
| R3 = −163.95 | D3 = 0.12 | | |
| R4 = 44.95 | D4 = 4.20 | N3 = 1.69680 | ν3 = 55.5 |
| R5 = 119.18 | D5 = Variable | | |
| R6 = 100.66 | D6 = 1.37 | N4 = 1.88300 | ν4 = 40.8 |
| R7 = 19.76 | D7 = 5.83 | | |
| R8 = −37.65 | D8 = 1.18 | N5 = 1.88300 | ν5 = 40.8 |
| R9 = 83.24 | D9 = 1.73 | | |
| R10 = 47.94 | D10 = 4.70 | N6 = 1.84666 | ν6 = 23.9 |
| R11 = −38.01 | D11 = 0.88 | | |
| R12 = −26.70 | D12 = 1.03 | N7 = 1.81600 | ν7 = 46.6 |
| R13 = −83.05 | D13 = Variable | | |
| R14 = 53.26 | D14 = 3.40 | N8 = 1.61800 | ν8 = 63.4 |
| R15 = −629.24 | D15 = 0.15 | | |
| R16 = 38.32 | D16 = 3.40 | N9 = 1.60311 | ν9 = 60.7 |
| R17 = 1684.80 | D17 = 0.15 | | |
| R18 = 35.63 | D18 = 2.70 | N10 = 1.51633 | ν10 = 64.1 |
| R19 = 55.61 | D19 = 0.15 | | |
| R20 = 22.31 | D20 = 5.54 | N11 = 1.48749 | ν11 = 70.1 |
| R21 = −162.15 | D21 = 7.68 | N12 = 1.85026 | ν12 = 23.9 |
| R22 = 14.89 | D22 = 4.86 | | |
| R23 = 33.69 | D23 = 3.5 | N13 = 1.57309 | ν13 = 42.6 |
| R24 = −35.33 | D24 = 1.0 | N14 = 1.84666 | ν14 = 23.9 |
| R25 = −63.72 | D25 = Variable | | |
| (aspherical surface) | | | |
| R26 = diaphragm | D26 = Variable | | |
| R27 = −37.90 | D27 = 0.98 | N15 = 1.83481 | ν15 = 42.7 |
| R28 = −279.06 | D28 = 4.90 | N16 = 1.53172 | ν16 = 48.9 |
| R29 = −27.90 | | | |

| f | 36.0 | 68 | 132.0 |
|---|---|---|---|
| D5 | 1.04 | 12.84 | 23.90 |
| D13 | 25.27 | 13.47 | 2.41 |
| D25 | 0.88 | 5.48 | 8.09 |
| D26 | 3.15 | 11.38 | 21.61 |

A = 0
B = 2.957 × 10⁻⁶
C = −8.998 × 10⁻⁹
D = −7.522 × 10⁻¹¹
E = 0

What is claimed is:

1. A zoom lens system comprising, from front to rear, a first lens unit of positive refractive power, a second lens unit of negative refractive power, a third lens unit of positive refractive power and a fourth lens unit, wherein when zooming from a wide angle end to a telephoto end, said first lens unit and said third lens unit are axially movable forward in unison, and said second lens unit is axially movable non-linearly relative to the movement of said first lens unit and said third lens unit, said zoom lens system satisfying the following conditions:

$$0.4\ fT < f1 < 0.65\ fT$$

$$0.4\ fW < |f2| < 0.25\ fT$$

$$0.12\ fT < f3 < 0.35\ fT$$

$$-0.18 < fW/f4$$

$$fT/f4 < 0.1$$

$$0.8 < |\beta 2T| < 1.0$$

where fi is the focal length of the i-th lens unit counting from the front, fW and fT are the shortest and longest focal lengths of the entire zoom lens system, respectively, and βT is the lateral magnification of said second lens unit when said zoom lens system is at the telephoto end.

2. A zoom lens system according to claim 1, wherein said first lens unit comprises, from front to rear, a meniscus-shaped negative lens of forward convexity, a positive lens of strong convex curvature toward the front, and a meniscus-shaped positive lens of forward convexity, satisfying the following conditions:

$$\nu ln < 30$$

$$\nu lp > 50$$

where $\nu ln$ is the Abbe number of the negative lens of the first lens unit, and $\nu lp$ is the mean Abbe number of the two positive lenses of the first lens unit.

3. A zoom lens system according to claim 1, wherein said second lens unit comprises, from front to rear, a first negative lens of concave curvature toward the rear, a second negative lens whose both surfaces are concave, and a positive lens, satisfying the following conditions:

$$R7 < |R8| < R9$$

$$R10 < R9$$

wherein R7 is the radius of curvature of the rear surface of said first negative lens of said second lens unit, R8 and R9 are the radii of curvature of the front and rear surfaces of said second negative lens of said second lens unit, and R10 is the radius of curvature of the front surface of said positive lens of said second lens unit.

4. A zoom lens system according to claim 1, wherein said fourth lens unit comprises, from front to rear, a negative lens and a positive lens, the refractive index of said negative lens of said fourth lens unit being higher than the refractive index of said positive lens of said fourth lens unit, and the rear surface of said positive lens of said fourth lens unit being convex towards the rear.

5. A zoom lens system according to claim 1, wherein said third lens unit includes, from the front, a lens of concave curvature toward the rear and a lens of positive refractive power having an aspherical surface, and said fourth lens unit includes a meniscus-shaped cemented lens of rearward convexity consisting of a glass lens of negative refractive power and a glass lens of positive refractive power cemented together at their adjoining surfaces, the glass of said positive lens having a lower refractive index then the refractive index of the glass of said negative lens.

6. A zoom lens system according to claim 1, wherein said third lens unit comprises, from front to rear, three positive lenses, a negative lens whose both surfaces are concave, and a positive lens, said third lens unit negative lens being made of a concave surface having the smallest radius of curvature within said third lens unit, and said third lens unit satisfying the following conditions:

$$R14 > R16 > R18$$

where R14, R16 and R18 are the radii of curvature of the front surfaces of said third lens unit first three positive lenses, respectively.

7. A zoom lens system according to claim 6, satisfying the following conditions:

$$1/R15 < 1/R17 < 1/R19$$

where R15, R17 and R19 are the radii of curvature of the rear surfaces of said third lens unit first three positive lenses, respectively.

8. A zoom lens comprising:
   a first lens unit having a positive refractive power;
   a second lens unit arranged on the image side of said first lens unit and having a negative refractive power;
   a third lens unit incuding a lens of concave curvature toward the rear, and a positive lens having an aspherical surface arranged just behind said concave curvature lens, said third lens unit being arranged on the image side of said second lens unit, and having a positive refractive power;
   a fourth lens unit including a meniscus-shaped doublet lens of rearward convexity consisting of a negative glass lens and a positive glass lens, said positive glass lens having a lower refractive index than the refractive index of said negative glass lens, said fourth lens unit being arranged on the image side of said third lens unit, said first lens unit and said third lens unit being both movable forward, and said second lens unit being movable simultaneously with and independently of said first lens unit and said third lens unit.

9. A zoom lens according to claim 8, satisfying the following condition:

$$0.12 \, fT < f3 < 0.35 \, fT$$

where f3 is the focal length of said third lens unit, and fT is the longest focal length of the entire zoom lens.

10. A zoom lens according to claim 9, wherein said third lens unit comprises a plurality of positive lenses, a cemented lens of concave curvature toward the rear with positive and negative lenses cemented together, and a positive lens having an aspherical surface.

* * * * *